(12) United States Patent
Dinakaran et al.

(10) Patent No.: US 10,807,031 B2
(45) Date of Patent: Oct. 20, 2020

(54) COMMERCIAL FILTER SEAL (71) Applicant: Flanders Corporation, Washington, NC (US)

(72) Inventors: Satish Dinakaran, Washington, NC (US); Kenneth Beacham, Washington, NC (US); Joseph Wood, Greenville, NC (US); John Taylor, Bath, NC (US); Dean Andrews, Grimesland, NC (US); Joel Davis, Washington, NC (US)

(73) Assignee: FLANDERS CORPORATION, Washington, NC (US)

( * ) Notice: Subject to any disclaimer, the term of this patent is extended or adjusted under 35 U.S.C. 154(b) by 271 days.

(21) Appl. No.: 15/493,278

(22) Filed: Apr. 21, 2017

(65) Prior Publication Data

US 2017/0304758 A1 Oct. 26, 2017

Related U.S. Application Data (60) Provisional application No. 62/326,482, filed on Apr. 22, 2016.

(51) Int. Cl.
*B01D 46/00* (2006.01)
*B01D 46/10* (2006.01)

(52) U.S. Cl.
CPC ......... *B01D 46/0005* (2013.01); *B01D 46/10* (2013.01); *B01D 2271/02* (2013.01); *B01D 2279/51* (2013.01)

(58) Field of Classification Search
CPC ........... B01D 46/00–546; B01D 2271/00–027; B01D 2279/50; B01D 2279/51
USPC .............................. 55/385.1–385.8, 490–519
See application file for complete search history.

(56) References Cited

U.S. PATENT DOCUMENTS

| | | | |
|---|---|---|---|
| 3,486,311 A | 12/1969 | Allan, Jr. | |
| 3,511,010 A | 5/1970 | Wood | |
| 3,712,631 A | 1/1973 | Forchini et al. | |
| 3,780,503 A | 12/1973 | Smith | |

(Continued)

FOREIGN PATENT DOCUMENTS

| | | |
|---|---|---|
| DE | 298 14 787 | 12/1999 |
| WO | WO 00/11300 A1 | 3/2000 |

OTHER PUBLICATIONS

Gel Filter Replacement Guidelines, Camfil Farr Technical Services Bulletin, (dated 2005) 3 pages.

*Primary Examiner* — T. Bennett McKenzie
(74) *Attorney, Agent, or Firm* — Alston & Bird LLP (57) ABSTRACT Provided are filtration systems, filters, and corresponding methods of installing and using a clean room filter. A filtration system may include a housing defining a vent opening and a filter opening. The housing may include a knife edge disposed about a perimeter of the filter opening and configured to extend downwardly. The filtration system may include a filter removably attached to the housing. The filter may include a frame having an opening and a channel disposed about a perimeter of the opening. The filter may further include a filter substrate disposed in the opening of the frame, a gasket disposed about a perimeter of the opening within the channel, and an adhesive compound disposed within the channel between the gasket and the channel. The filter may be configured to engage the knife edge of the housing, such that air may be configured to pass between the clean room and a duct via the filter.

29 Claims, 8 Drawing Sheets

(56) References Cited

U.S. PATENT DOCUMENTS

| | | |
|---|---|---|
| 3,986,850 A | 10/1976 | Wilcox |
| 4,082,525 A | 4/1978 | Allan |
| 4,175,936 A | 11/1979 | Lough et al. |
| 4,233,044 A | 11/1980 | Allan |
| 4,371,386 A | 2/1983 | DeVecchi |
| 4,601,737 A * | 7/1986 | Gerbig ................ B01D 46/002 55/493 |
| 4,639,261 A | 1/1987 | Pittman et al. |
| 4,671,811 A | 6/1987 | Cadwell, Jr. et al. |
| 4,678,487 A | 7/1987 | Cadwell, Jr. et al. |
| 4,860,420 A | 8/1989 | Cadwell, Jr. et al. |
| 4,946,484 A * | 8/1990 | Monson ................... E04B 9/02 454/187 |
| 5,733,348 A | 3/1998 | Skarsten |
| 6,027,542 A | 2/2000 | Brandhofer et al. |
| 6,117,202 A * | 9/2000 | Wetzel ............... B01D 46/0005 454/187 |
| 6,267,793 B1 | 7/2001 | Gomez et al. |
| 6,273,926 B1 | 8/2001 | Larsson |
| 6,568,540 B1 * | 5/2003 | Holzmann ........... B01D 29/016 210/445 |
| 7,220,291 B2 | 5/2007 | Morse et al. |
| 7,401,791 B2 | 7/2008 | Andrick et al. |
| 7,833,299 B2 | 11/2010 | Dawson et al. |
| 8,268,032 B2 | 9/2012 | Eyers et al. |
| 8,667,740 B1 | 3/2014 | Hashimoto et al. |
| 2005/0187325 A1 * | 8/2005 | Yuan ........................ C08K 3/08 524/394 |
| 2007/0169447 A1 * | 7/2007 | Osborne ............ B01D 46/0005 55/481 |

\* cited by examiner

COMMERCIAL FILTER SEAL

CROSS-REFERENCE TO RELATED APPLICATIONS

This application claims priority from U.S. Provisional Patent Application No. 62/326,482, filed on Apr. 22, 2016, which is incorporated by reference herein in its entirety.

BACKGROUND

Commercial clean rooms may be supplied with constant, filtered air to control and maintain a contaminant-free work area. Filtered air may be provided through ceiling vents, which remove contaminants from the air and maintain a constant flow into the work area. Traditional filtration systems include individual filters that may be positioned in the ceiling of the clean room to filter incoming or outgoing air. However, these filters are often insufficiently sealed, such that air may bypass the filter and introduce contaminants into the work area. Modern systems may use thick gels that are prone to spilling from the edges of the filter and lose their seals quickly if installed or replaced incorrectly.

Applicant has identified a number of additional deficiencies and problems associated with conventional commercial filtration systems and other associated systems and methods. Through applied effort, ingenuity, and innovation, many of these identified problems have been solved by developing solutions that are included in embodiments of the present invention, many examples of which are described in detail herein.

BRIEF SUMMARY OF THE INVENTION

Provided herein are a filter, filtration system, and associated methods of using and installing a filter and filtration system. The filtration system may be used in a clean room, and may include a housing configured to engage a clean room ceiling. The housing may include a vent opening and a filter opening. The housing may be configured to engage a duct at the vent opening. The housing may further comprise a knife edge disposed about a perimeter of the filter opening. The knife edge may be configured to extend downwardly relative to the clean room ceiling. The filtration system may further include a filter removably attached to the housing. The filter may include a frame comprising an opening configured to admit air therethrough, and the frame may include a channel disposed about a perimeter of the opening. The filter may further include a filter substrate disposed in the opening of the frame, such that the filter substrate may be configured to filter air passing through the opening. The filter may include a gasket disposed about a perimeter of the opening within the channel, and may include an adhesive compound disposed within the channel between the gasket and the channel. The adhesive compound may be configured to prevent air from passing between the gasket and channel, and the adhesive compound may be configured to maintain the gasket at least partially within the channel. The filter may be configured to engage the knife edge of the housing, such that air may be configured to pass between the clean room and the duct via the filter.

In some embodiments, the channel comprises an inner wall, an outer wall, and a bottom wall connecting the inner wall and the outer wall, and the adhesive compound may be disposed between the gasket and at least the bottom wall of the channel.

The frame may further comprise a side wall extending about a perimeter of the opening, such that the opening of the frame may comprise an upper opening and a lower opening. The channel may comprise an inner wall, an outer wall, and a bottom wall, and wherein the side wall of the frame may be the inner wall of the channel.

In some embodiments, the housing may include a flange extending from an inner surface of a side wall of the housing, and the knife edge may be attached to the flange. The knife edge may be attached at a distal end of the flange opposite a connection between the flange and the inner surface of the side wall of the housing.

In some embodiments, the gasket may comprise a fully-cured, cross-linked silicone.

In some embodiments, the housing may further comprise at least one attachment tab configured to engage the filter in a working position. The housing may further comprise a tab support configured to slidably receive the attachment tab and a retaining member configured to retain the attachment tab on the tab support. The attachment tab may comprise a protrusion configured to engage the filter. The attachment tab may comprise a collar defining a cylindrical bore for receiving at least a portion of the tab support therein. In some embodiments, the tab support may further comprise a support collar, and the support collar may be configured to engage the collar in a working position of the filter.

In another embodiment, a filter for a clean room may be provided. The filter may include a frame defining an opening configured to admit air therethrough. The frame may comprise a channel disposed about a perimeter of the opening. The filter may include a filter substrate disposed in the opening of the frame, such that the filter substrate may be configured to filter air passing through the opening. The filter may further include a gasket disposed about a perimeter of the opening within the channel, and the filter may include an adhesive compound disposed within the channel between the gasket and the channel. The adhesive compound may be configured to prevent air from passing between the gasket and the channel, and the adhesive compound may be configured to maintain the gasket at least partially within the channel.

In some embodiments, the channel may comprise an inner wall, an outer wall, and a bottom wall connecting the inner wall and the outer wall, and the adhesive compound may be disposed between the gasket and at least the bottom wall of the channel.

In some embodiments, the frame may further comprise a side wall extending about a perimeter of the opening, such that the opening of the frame comprises an upper opening and a lower opening. The channel may comprise an inner wall, an outer wall, and a bottom wall, and the side wall of the frame may be the inner wall of the channel.

In some embodiments, the gasket may comprise a fully-cured, cross-linked silicone.

A method of installing a filtration system in a clean room ceiling may be provided. The method may include engaging a housing with the clean room ceiling. The housing may define a vent opening and a filter opening. The housing may be configured to engage a duct at the vent opening. The housing may further comprise a knife edge disposed about a perimeter of the filter opening. The knife edge may be configured to extend downwardly relative to the clean room ceiling. The method may further include engaging a filter with the knife edge of the housing, such that air may be configured to pass between the clean room and the duct via the filter. The filter may comprise a frame defining an opening configured to admit air therethrough, and the frame member may comprise a channel disposed about a perimeter of the opening. The filter may further include a filter substrate disposed in the opening of the frame, such that the filter substrate may be configured to filter air passing through the opening. The filter may include a gasket disposed about a perimeter of the opening within the channel, and the filter may include an adhesive compound disposed within the channel between the gasket and the channel. The adhesive compound may be configured to prevent air from passing between the gasket and the channel, and the adhesive compound may be configured to maintain the gasket at least partially within the channel.

In some embodiments, the channel may include an inner wall, an outer wall, and a bottom wall connecting the inner wall and the outer wall, and the adhesive compound may be disposed between the gasket and at least the bottom wall of the channel.

In some embodiments, engaging the filter with the knife edge of the housing may further comprise engaging at least one attachment tab with the filter to compress the gasket and support the filter.

In some embodiments, engaging the at least one attachment tab with the filter may comprise tightening a retaining member on a tab support to retain the at least one attachment tab against the filter.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

Clean rooms provide low-contaminant work areas for manufacturing and using sensitive materials, such as delicate electronics, sensitive testing devices, and precisely prepared chemicals. Clean rooms may be a substantially sealed area, kept separated from the external environment by several decontamination areas for the users and numerous filtration systems for circulating air. These work areas may include a ventilation system that maintains generally uniform and constant airflow through the clean room. The airflow may be filtered prior to entering the work area, and the air may carry any contaminant particles to one or more exhaust outlets. In some embodiments, the clean room may be kept at a positive pressure over the surrounding environment, such that any leaks or contaminants are forced out of the clean room rather than being drawn in.

In some embodiments, air is supplied to the work area of the clean room by a plurality of openings in the ceiling. The air may then exhaust from the clean room via openings in the walls and/or floor, such that a steady flow of air passes through the room to remove lingering contaminants. This configuration may be modified such that air is supplied from one or more of the walls or floor of the clean room. For example, air may be supplied through one wall and exhausted through an opposite wall of the clean room. Air may additionally or alternatively be exhausted through one or more openings in the ceiling of the clean room.

The openings of the ventilation system may include filters for removing contaminants from the air. In some embodiments, each of the plurality of openings in the ceiling of the clean room may have a corresponding air supply duct and filtration system coupled thereto. The filtration systems may be sealed to the ceiling of the clean room, so that the clean room remains substantially isolated from the surrounding environment. The filtration system may filter incoming air from the ductwork, while sealing sufficiently to prevent the air from bypassing the filters and entering the work area directly.

Embodiments discussed herein include a filtration system, a filter, and associated methods of installing a filter for filtering the air of a clean room. As discussed herein, the depicted filter includes a gasket and adhesive layer for providing a strong seal between the filter and its housing. The depicted seal may be quick and simple to install and may have a high tolerance for error or misalignment to provide a consistently strong seal.

Figure 1:
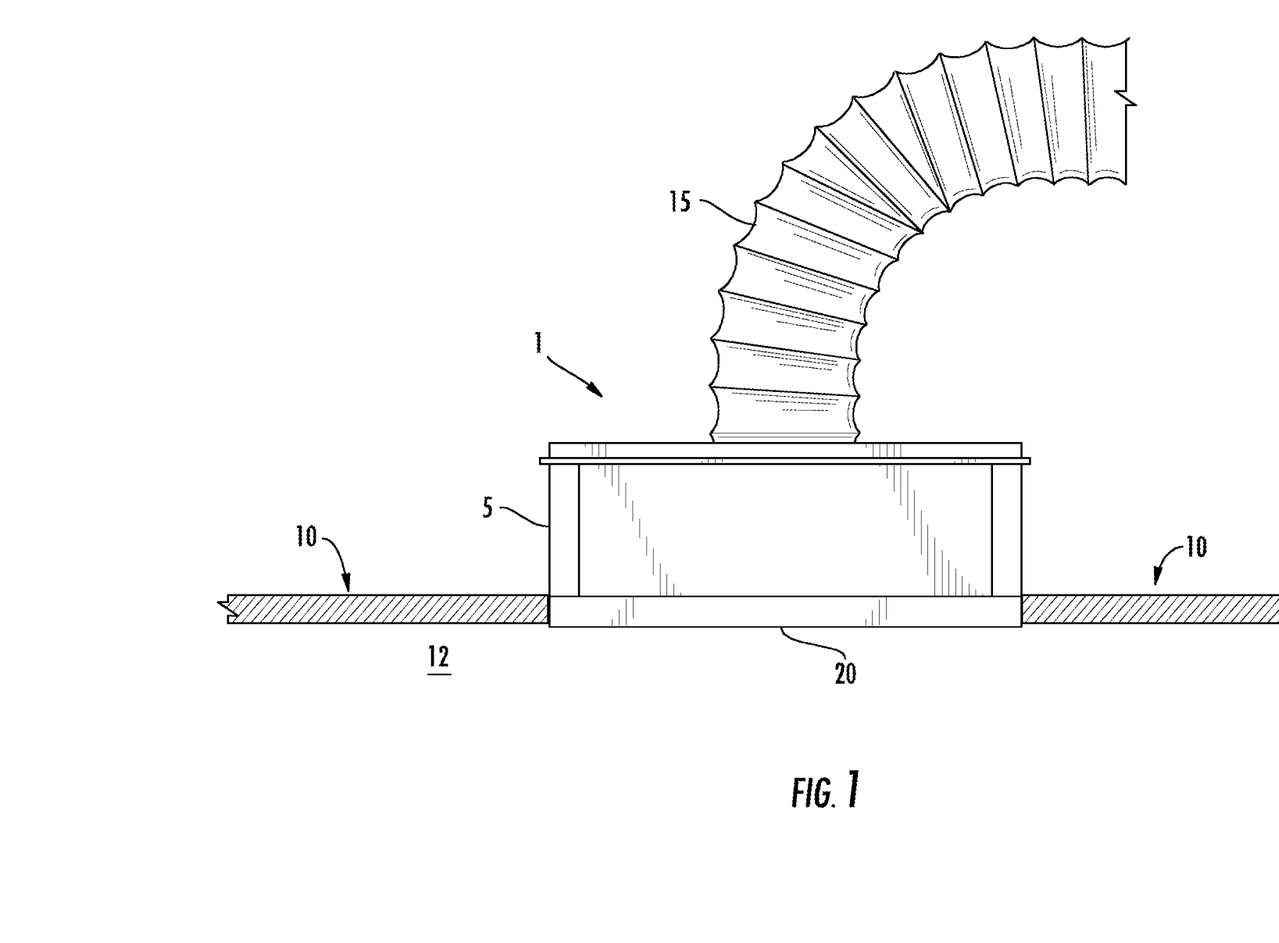
FIG. 1 shows a side view of a filtration assembly installed in a clean room ceiling according to some embodiments discussed herein.

With reference to FIG. 1, a filtration system 1 is shown according to some embodiments discussed herein. The depicted filtration system 1 includes a housing 5 attached to a ceiling 10 above the work area 12 of a clean room. The depicted housing 5 is attached to a duct 15 for directing air through the filtration system 1 to the work area 12 from an air source (e.g., an air conditioning system or the like, not shown). A diffuser 20 may be positioned beneath the filtration system 1 to distribute air evenly throughout the clean room. Although one filtration system 1 is depicted in FIG. 1, a plurality of filtration systems may be distributed across the ceiling 10 of the clean room. In some embodiments, the filtration systems 1 may be abutting one another (e.g., in adjacent openings of a ceiling grid), and in some embodiments the filtration systems 1 may be spaced from one another. As used herein, directional terms such as "upper," "lower," "above," "beneath," or the like refer to the relative position of the described features oriented with respect to the clean room, with the example embodiments of the filtration system disposed in the ceiling of the clean room. One of ordinary skill in the art will appreciate that these directions are relative terms, which may be rotated or repositioned depending on the location of the filtration unit (e.g., with the lower side of the filter 2 facing the clean room).

Figure 2:
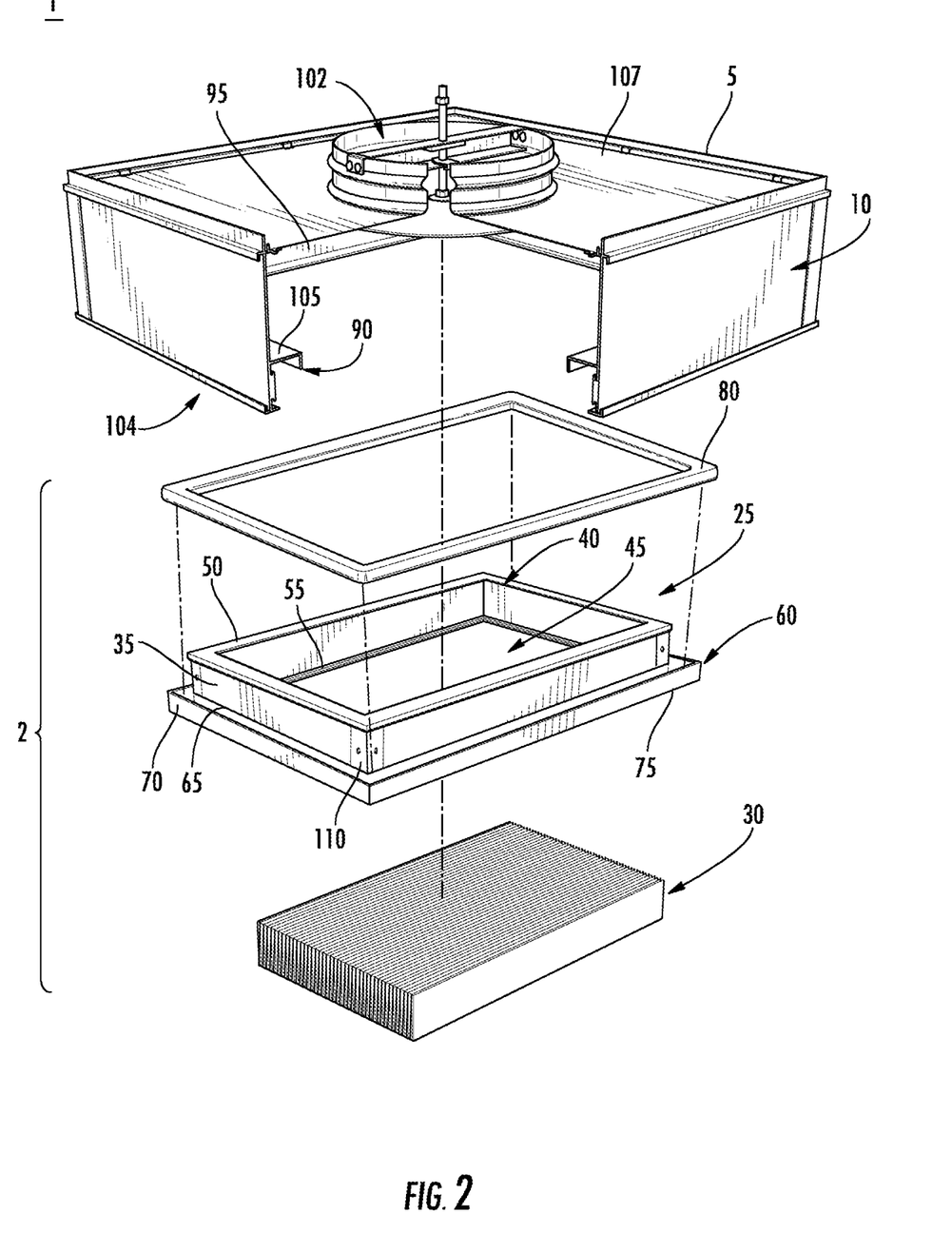
FIG. 2 shows an exploded view of a filtration assembly according to some embodiments discussed herein.

Turning to FIG. 2, an exploded view of a filtration system 1 is shown according to some embodiments discussed herein. The depicted filtration system 1 includes the housing 5 and a filter 2 disposed therein. The filter 2 may include a filter frame 25 defining a rigid structure of the filter. The filter frame 2 may maintain and support a filter substrate 30 therein. The filter substrate 30 may include high efficiency particular air (HEPA) filter media, ultra-low penetration air (ULPA) filter media, or other filter media as would be understood by one of ordinary skill in the art in view of the present disclosure.

The filter frame 25 may include a side wall 35 disposed about a perimeter of the filter frame to prevent air from leaking through the sides of the filter substrate 30. The filter frame 25 may further include an upper opening 40 and a lower opening 45, relative to the ceiling and clean room, for allowing air to pass through the filter. The filter frame 25 may further define an upper lip 50 and a lower lip 55 for holding the filter substrate 30 within the frame.

With continued reference to FIG. 2, the filter frame 25 may further include a channel 60 disposed about an outer perimeter of the filter frame. As used herein, the features disposed "about a perimeter" of other features need not form the boundary surfaces of the features which they surround, and instead, may be generally positioned about these features. The depicted channel 60 is disposed circumferentially about the side wall 35 of the filter frame 25 in a plane parallel to the upper opening 40 and lower opening 45 of the filter frame. The channel 60 may include an inner wall 65, an outer wall 70, and a bottom wall 75. In the depicted embodiment, the inner wall 65 is the side wall 35 of the filter frame 25. In some embodiments, the channel 60 may include a separate inner wall. Although the inner wall 65, outer wall 70, and bottom wall 75 are shown substantially perpendicular to each other, in some embodiments, the channel 60 may define a "U" shape, such that the inner wall 65, outer wall 70, and bottom wall 75 transition gradually between one another. In some embodiments, the inner wall 65 may be substantially parallel to the outer wall 70. In some embodiments, the inner wall 65 and outer wall 70 may be angled inwardly or outwardly relative to one another.

The channel 60 may be disposed at a lower end of the side wall 35 relative to the installed orientation of the filter system. In some embodiments, the channel may be positioned at the top end of the side wall 35 or proximate the middle of the side wall. In some embodiments, the channel 60 may be positioned on top of the filter frame 25 (e.g., at the upper lip 50.

Figure 3:
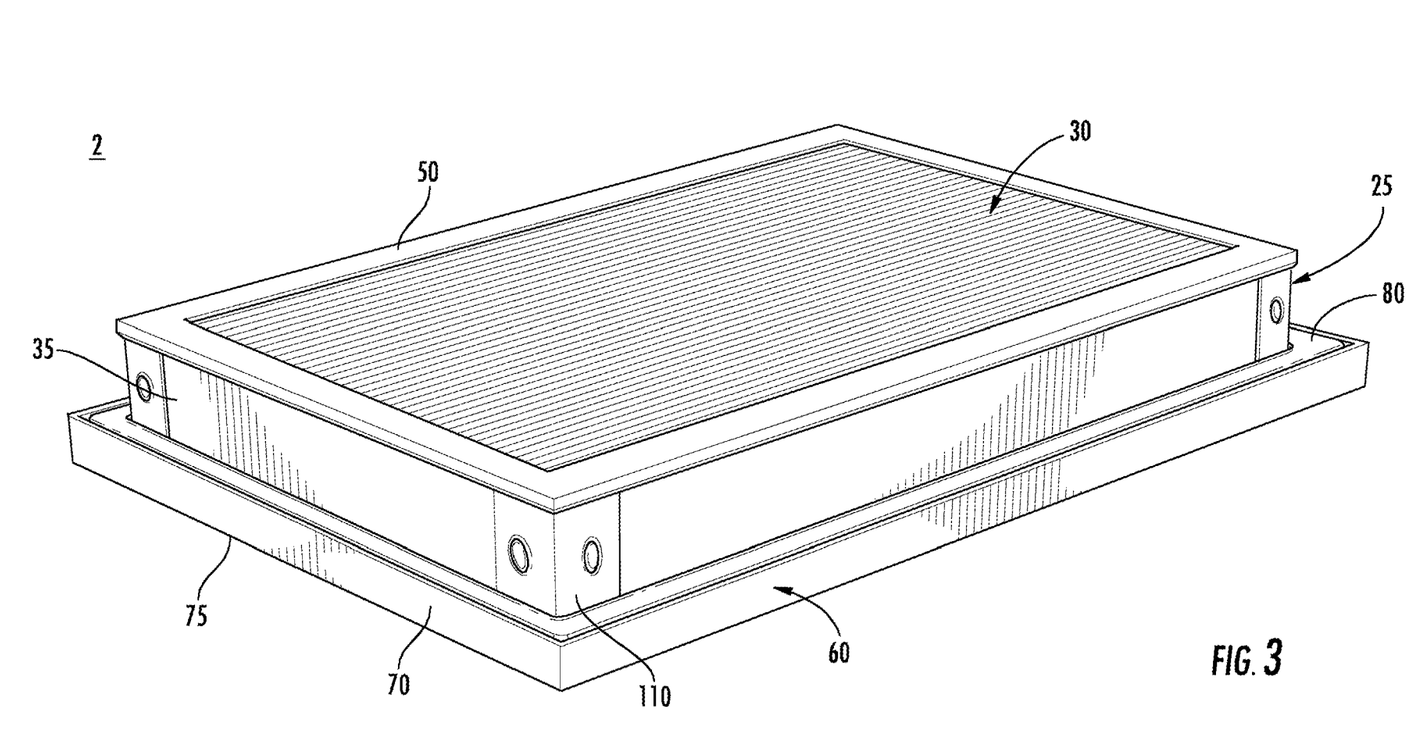
FIG. 3 shows an isometric view of a filter according to some embodiments discussed herein.

With reference to FIGS. 2 and 3, a gasket 80 may be disposed about a perimeter of the frame within the channel 60. In some embodiments, the gasket 80 may extend continuously around the side wall 35 of the filter frame 35, such that the gasket 80 and channel 60 are configured to encircle the filter frame. In some embodiments the gasket 80 may extend continuously about the filter frame 25 between the inner wall 65 and the outer wall 70 of the channel 60.

The gasket 80 may be made of a closed cellular foam. In some embodiments, the gasket 80 may be made of a fully cured, cross-linked silicone material. The gasket 80 may additionally or alternatively be made of any flexible, elastic material (e.g., rubber). For example, in some embodiments, the gasket 80 may be made of polytetrafluoroethylene (PTFE) such as Teflon® by Chemours.

Turning back to FIG. 2, the gasket 80 may be secured within the channel 60 by an adhesive 85, and the adhesive may be disposed about a perimeter of the channel 60 along the bottom wall 75. In some embodiments, the adhesive 85 may retain the gasket 80 within the channel 60 and may seal a space between the channel and the gasket. In some embodiments, the adhesive 85 may cover the bottom wall 75 of the channel 60 and may extend at least partially up the inner wall 65 and the outer wall 70 of the channel. In some embodiments, the adhesive 85 may cover a bottom surface and at least a portion of the side surfaces of the gasket 80. The adhesive 85 may be sufficiently flexible to allow the gasket 80 to flex under pressure, and the adhesive may be sufficiently viscous to prevent air from bubbling therethrough under pressure. For example, the adhesive 85 may be made of RTV silicones, urethanes, etc.

The housing 5 may include a knife edge 90 about a perimeter of the housing for engaging the gasket 80. As discussed herein, the knife edge 90 may be attached to the housing 5, and the depicted knife edge 90 extends downwardly (e.g., towards the work area of the clean room when the filtration system is installed in the ceiling). The knife edge 90 may facilitate replacement of the filter 2 with its downward position by allowing the filter to be removed and replaced by lowering the filter downwardly out of engagement with the knife edge from within the clean room. The housing 5 may include a vent opening 102 in the top surface 107 for allowing air to enter the housing. The vent opening 102 may include an upwardly extending flange for sealingly attaching the duct 15 (shown in FIG. 1) to the housing. The housing may further include a filter opening 104 disposed at a bottom of the housing. The filter 2 may be engaged with the housing 5 through the filter opening 104, and the housing may sealingly engage the ceiling 10 (shown in FIG. 1) at or near the filter opening 104.

In operation, the upper opening 40 of the filter frame 25 and the lower opening 45 of the filter frame may define an airflow path therethrough, and the airflow path may pass through the filter substrate 30. The housing may be substantially sealed from the vent opening 102 to the filter opening 104 to direct air from the duct 15 (shown in FIG. 1) through the filter substrate 30 in the airflow path. The knife edge 95 of the housing 5, the gasket 80, the adhesive 85, and the channel 60 may extend continuously around the filter frame 25 to seal the filter to the housing and direct substantially all of the air from the duct 15 (shown in FIG. 1) through the filter substrate 30.

In some embodiments, an inner surface 95 of a housing side wall 100 may include a flange 105 extending from the inner surface 95 inwardly into the housing 5. The knife edge 90 may extend downwardly from a distal edge of the flange 105, such that the knife edge 90 is spaced about and parallel to the inner surface 95 of the housing side wall 100 about a perimeter of the side wall. In some embodiments, the flange 105 and knife edge 90 may be perpendicular to each other. In some embodiments, the knife edge 90 may be a bottom edge of the housing wall 100. In some embodiments, the knife edge 90 may be attached to an inner surface of the top 107 of the housing 5, or the knife edge 90 may be attached to an outer surface of the housing side wall 100.

The knife edge 90 may be positioned about the housing 5 at or proximate the center of the channel 60 of the filter 2. In such embodiments, the length of the knife edge 90 may equal the length of a line extending about the center of the channel 60. The knife edge 90 may extend continuously around the housing 5 to prevent air from bypassing the filter 2 and seal completely around the filter. A plane of the distal, perimeter of the knife edge 90 may parallel to a plane of the top 107 of the housing to align with the position of the gasket 80.

With reference to FIG. 3, an isometric view of the filter 2 is shown having a gasket 80 disposed perimetrically in the channel 60 according to some embodiments discussed herein. The filter frame 25 may include corner support members 110 that add rigidity to the frame. The support members 110 may occupy a portion of the channel 60, such that the inner wall 65 of the channel and the side wall 35 of the frame 25 may protrude outwardly at the corners. The gasket 80 may provide a seal in the channel 60 against the varying surface of the inner wall 65/side wall 35. In the depicted embodiment, the gasket 80 extends up to the edge of the outer wall 70 of the channel 60.

Figure 4:
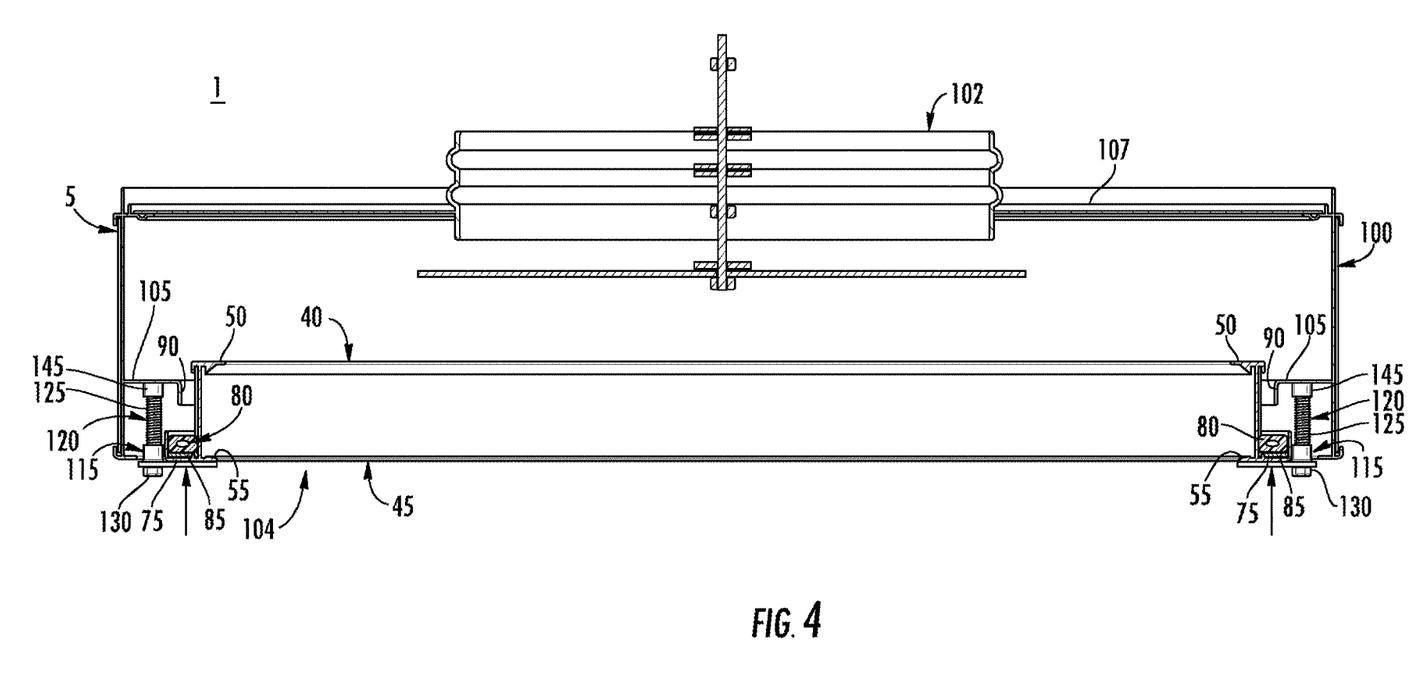
FIG. 4 shows a cross-sectional view of a filtration assembly with a filter being installed according to some embodiments discussed herein.
Figure 5:
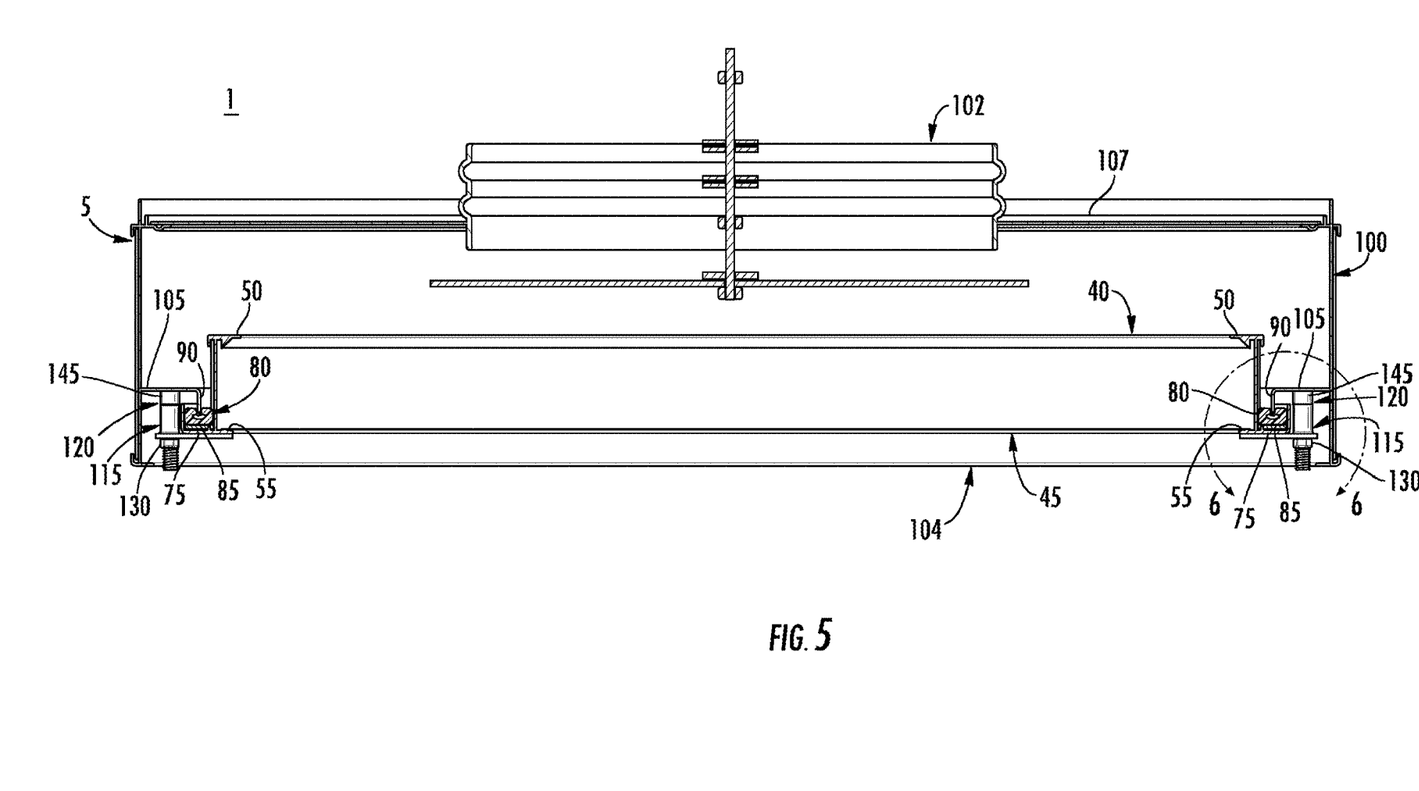
FIG. 5 shows a cross-sectional view of the filtration assembly of FIG. 4 with the filter in an operational position according to some embodiments discussed herein.
Figure 6:
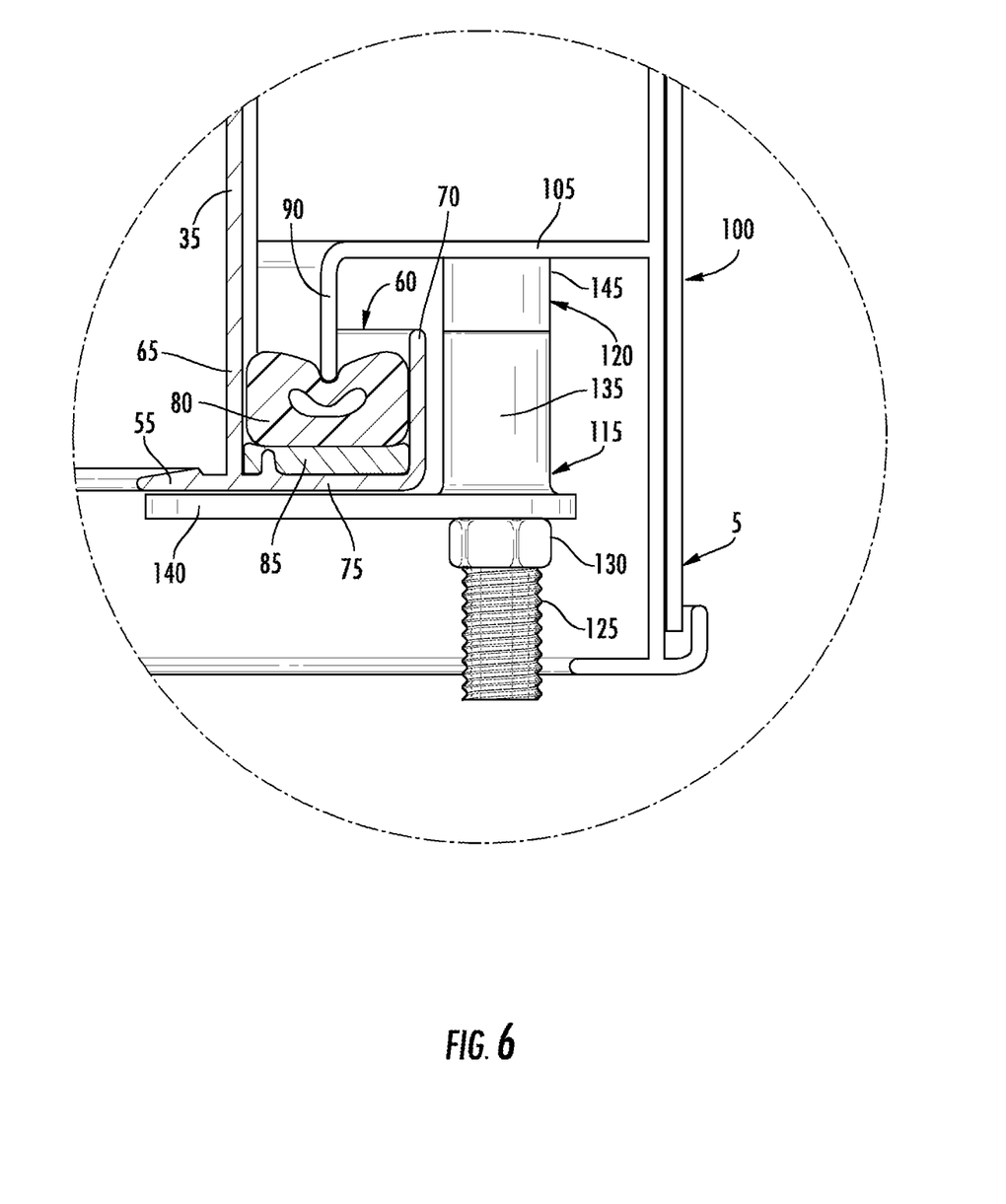
FIG. 6 shows a zoomed view of an attachment tab engaging a filter according to some embodiments discussed herein.

Turning to FIGS. 4-6, cross-sectional views of the filtration system 1 are shown. The depicted embodiment shows the frame 25 having the upper lip 50 and lower lip 55 for retaining the filter substrate 30 (shown in FIG. 2). The upper lip 50 and lower lip 55 may include adhesives, seals, clamps, or other attachment means to maintain the filter substrate 30 within the frame 25. In operation, air may pass through the vent opening 102 from the duct 15 (shown in FIG. 1), through the filter substrate 30, and out the filter opening 104.

In the embodiment shown in FIG. 4, the filter 2 is shown separate from the housing 5 prior to engagement of the knife edge 90 with the gasket 80. A plurality of attachment tabs 115 may be used to secure the filter 2 to the housing 5. In some embodiments, a tab support 120 may be attached to the housing 5 for supporting each of the respective attachment tabs 115. The tab support 120 may include a threaded portion 125 configured to engage a retaining member 130 (e.g., a nut) for securing the attachment tabs 115. In some embodiments, the retaining member may include clips, pins, set screws, or any other attachment mechanism to retain the attachment tabs 115 including threads on an inner cylindrical bore of the attachment tabs.

In the depicted embodiment, the tab supports 120 are attached to a lower surface of the flange 105 of the housing 5 such that the tab supports 120 extend parallel to the knife edge 90. In some embodiments, the tab supports 120 may extend from the top wall 107 of the housing, or may attach directly to the side wall 100 of the housing.

Figure 8:
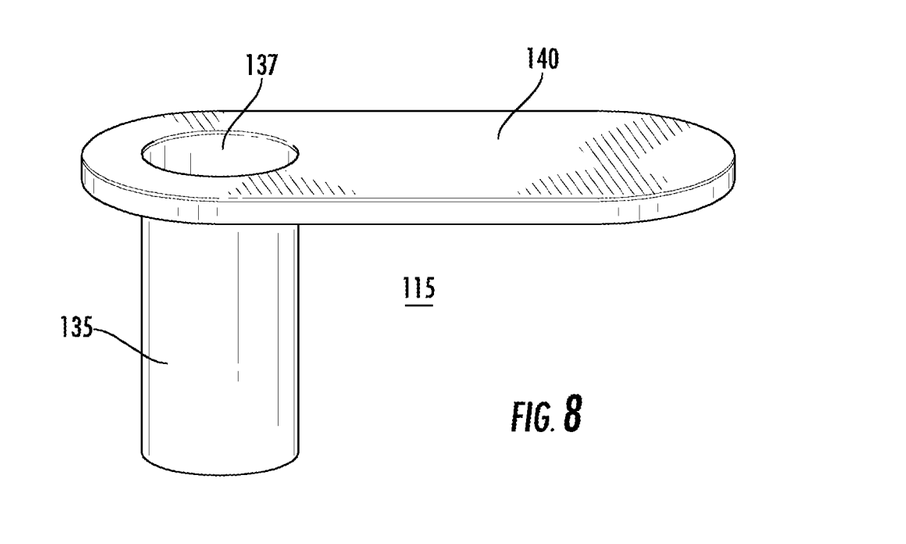
FIG. 8 shows an attachment tab according to some embodiments discussed herein.

FIG. 8 shows a detailed view of an attachment tab 115 according to some embodiments discussed herein. The attachment tab 115 may include a collar 135 having a cylindrical bore 137 therein and a protrusion 140 for engaging the filter 2 (shown in FIGS. 4-6). Relative to the orientation shown in FIG. 8, a lower surface of the protrusion 140 may engage and support the filter 2. The collar 135 may extend along the threaded portion 125 of the tab support 120 as shown in FIGS. 4-6 and the nut 130 may abut the protrusion 140 adjacent the cylindrical bore 137.

With respect to FIGS. 4-6, the nut 130 may screw onto the threaded portion 125 and tighten the attachment tabs 115 into place. The tabs 115 may support and maintain the frame 2 in position. In some embodiments, the tabs 115 may rotate about the tab support 120 about a longitudinal axis of the collar 135, such that the tabs may be twisted away from the frame 2 (e.g., the protrusion 140 may be pivoted towards the housing side wall 100) to allow the frame to be inserted or removed without entirely unscrewing the nut 130. In some embodiments, two or more tabs 115 may be used. In some further embodiments, four or more tabs 115 may be used.

Figure 9:
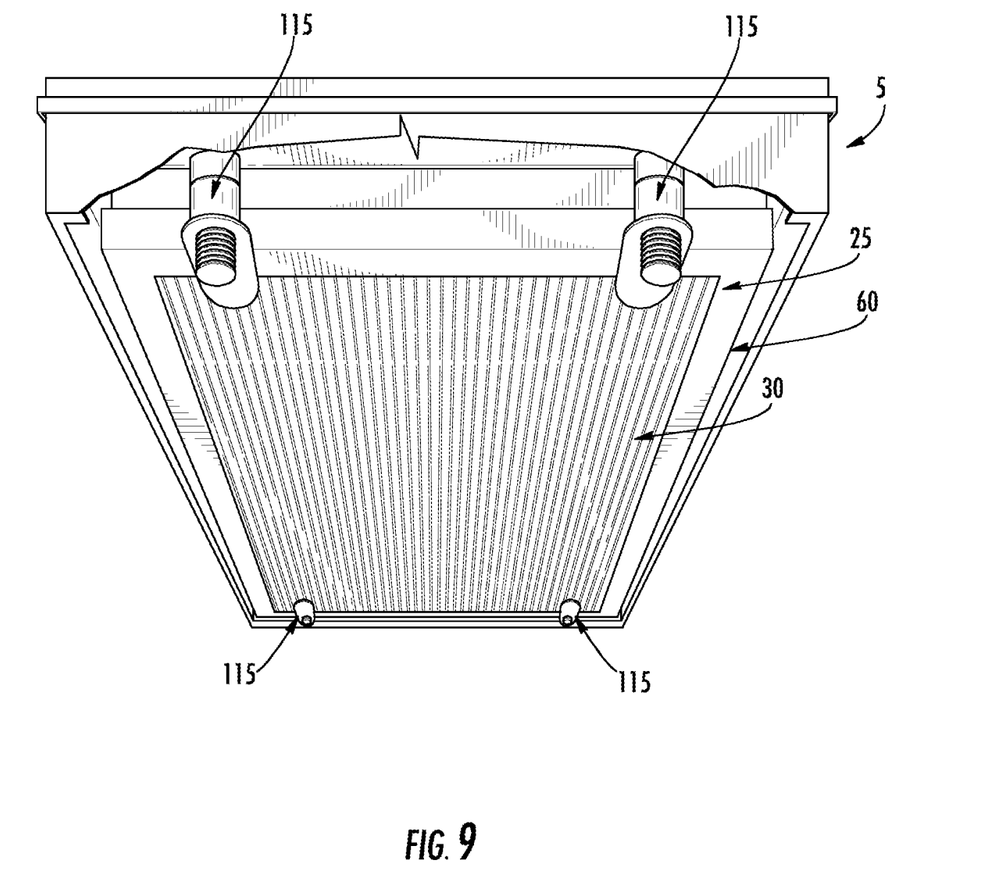
FIG. 9 shows an example method of installing a filter in a filtration assembly according to some embodiments discussed herein.

Comparing FIG. 3 and FIGS. 4-6, in some embodiments, one tab may be positioned on each side of the filter 2 (e.g., four tabs for four sides of a rectangular filter). In some embodiments, two tabs 115 may be positioned on a single side of the filter 2, and some sides of the filter may not include any tabs. For example, in some embodiments, two tabs 115 may be spaced along each of the longer sides of the filter 2 adjacent the sides of the filter, and no tabs may be positioned adjacent the short sides. With reference to FIG. 9, an embodiment of the filtration system 1 is shown having two tabs 115 on each of the shorter sides of the filter 2 and no tabs on the longer sides of the filter. Turning back to FIGS. 4-6, in some embodiments, the protrusion 140 may engage an underside of the bottom wall 75 of the channel 60. In some embodiments, the protrusion 140 may engage a slot or groove (not shown) in the filter frame 25 or any other portion of the filter frame.

The collar 135 may remain substantially concentric with an axis of the tab support 120 before, during, and after installation of the filter 2. In such embodiments, the protrusion 140 may remain aligned substantially parallel to a plane of the bottom of the filter 2 and the bottom 75 of the channel 60. The collar 135 may keep the protrusion 140 in its operational orientation to prevent jumping or sticking of the attachment tab 115 during installation, which may be caused if the protrusion 140 were angled and thus the cross-section of the opening narrowed. The collar 135 thereby allows the filter 2 to be tightened into the housing 5 evenly and smoothly to ensure proper alignment and tightening of the attachment tabs 115.

In some embodiments, the tab supports 120 may include a support collar 145 disposed at a near end of the tab support that attaches to the housing 5. The support collar 145 may be a section of the tab support 120 that is not threaded, and the support collar 145 may define a diameter that is larger than the cylindrical bore 137 of the attachment tabs 115, such that the tabs stop at the distal edge of the support collar and do not slide over the support collar. In some embodiments, end surfaces of the collar 135 and the support collar 145 may abut each other in a working position of the filter as shown in FIG. 5. The support collar 145 and the collar 135 may each define lengths such that the combined length of the support collar 145 and collar 135 facilitates the desired compression of the gasket 80 and adhesive 85. Said differently, the nut 130 may tighten until the support collar 145 and collar 135 abut one another, and in that position, the gasket 80 may be ideally compressed. In some embodiments, the nut 130 may tighten to a predetermined torque (e.g., 10 ft lbs) using a torque wrench or other specialized tightening tool. For example, in some embodiments, the attachment tabs 115 may tighten the filter 2 until the gasket 80 is compressed 10 to 30%.

During installation, the filter 2 may be raised into engagement with the knife edge 90 and secured by the attachment tabs 115. With reference to FIG. 5, the embodiment of FIG. 4 is shown raised into position with the nuts 130 tightened to compress the gasket 80. The knife edge 90 may engage the gasket 80 to seal the filter in the housing 5 and force air from the duct 15 (shown in FIG. 1) through the filter substrate 30 (shown in FIG. 2) before entering the work area 12 (shown in FIG. 1). As discussed herein, the adhesive 85 may seal the space between the gasket 80 and the channel 60. Moreover, the adhesive 85 may retain the gasket 80 in position within the channel 60 to keep the gasket from deflecting (e.g., when the knife edge 90 contacts the gasket 80 at a non-perpendicular angle or off center on the surface of the gasket 80).

Figure 7A:
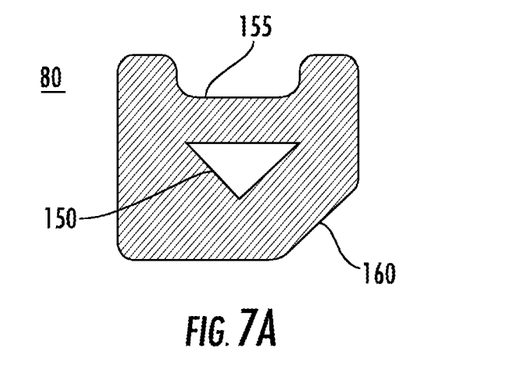
FIGS. 7A-7D show cross-sectional views of several gasket designs according to some embodiments discussed herein.
Figure 7B:
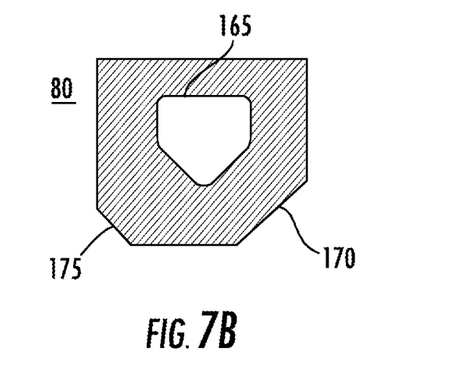
Figure 7C:
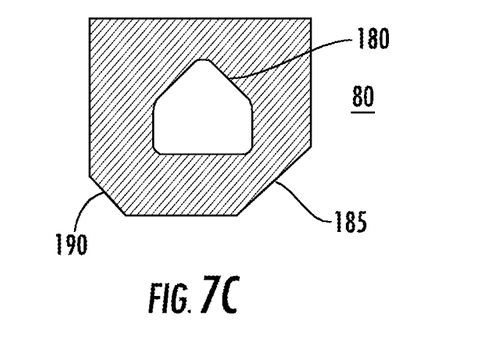
Figure 7D:
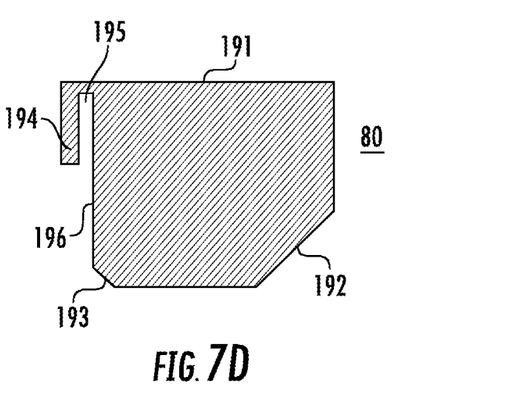

With reference to FIGS. 7A-7D, cross-sectional examples of various gaskets 80 are shown in accordance with some embodiments discussed herein. The cross-sectional views are taken across a short area of the gaskets 80 (e.g., perpendicular to the perimetric direction). While in some embodiments the gasket 80 may have a continuous-density cross-section (e.g., as shown in FIG. 7D), in other embodiments the gasket 80 may include a void (e.g., voids 150, 165, 180 shown in FIGS. 7A-7C) extending continuously along the length of the gasket in the perimetric direction. FIG. 7A depicts a gasket 80 having a triangular void 150 extending along its center. The gasket 80 of FIG. 7A further includes a recess 155 extending along the upper surface of the gasket. The recess 155 may include raised edges configured to receive the knife edge 90 therebetween, such that the recess prevents the knife edge from deflecting the gasket 80 to either side, which may result in an ineffective seal.

With continued reference to FIG. 7A, in some embodiments, the gasket 80 may include a sloped edge 160, which may decrease the bottom surface area of the gasket and increase the pressure of the bottom of the gasket on the bottom surface 75 of the channel 60 (shown in FIGS. 2 and 4-6). In some embodiments, the sloped surface 160 may be disposed on the lower, inside edge (e.g., relative to the inner and outer walls of the channel) such that the sloped surface engages a corner of the channel joining the inner wall 65 and bottom wall 75 (shown in FIGS. 2 and 4-6). In some embodiments, the sloped surface (e.g., sloped surface 160) may be configured to bridge a notch, shown in FIGS. 4-6, in the channel which maintains the corner supports 110 (shown in FIG. 3).

With reference to FIG. 7B, in some embodiments, the gasket 80 may include an inverted-pentagonal void 165 extending along its center. The depicted embodiment also includes a flat upper surface of the gasket 80, a sloped lower, inside edge 170 and a sloped lower, outside edge 175. In some embodiments, one sloped surface may be longer than another. For example, in the embodiment shown in FIG. 7B, the lower, inside surface 170 is longer than the lower outside surface 175.

With reference to FIG. 7C, an embodiment of the gasket 80 is shown having a pentagonal void 180 extending along its center. The depicted embodiment also includes a flat upper surface of the gasket 80, a sloped lower, inside edge 185 and a sloped lower, outside edge 190. In some embodiments, for example, as shown in FIGS. 4-6, the gasket 80 may define a deformable, circular cross section and may include a circular void extending along its center.

With reference to FIG. 7D, an embodiment of the gasket 80 is shown that has a continuous-density cross-section. The depicted embodiment also includes a flat upper surface 191, a sloped lower, inside edge 192, and a sloped lower, outside edge 193. As with FIGS. 7B and 7C, in some embodiments, the length of the sloped lower, inside edge 192 may be longer than the length of the sloped, lower outside edge 193. In addition, the gasket 80 shown in FIG. 7D also includes a flange portion 194 that extends downwardly from one side of the upper surface 191, such that a narrow gap 195 is created between the flange portion 194 and the nearest side wall 196 of the gasket 80. In some embodiments, such as the embodiment shown in FIG. 7D, the length of the flange portion 194 is less than the length of the nearest side wall 196, and the flange portion 194 extends from a side of the upper surface 191 opposite the sloped, inside edge 192.

As detailed herein, the filtration system may be installed in a clean room to easily and precisely remove contaminants from incoming air. An example method of installing a filtration system in a clean room ceiling may include engaging a housing with the clean room ceiling. The housing may define a vent opening and a filter opening. The housing may be configured to engage a duct at the vent opening. The housing may further include a knife edge disposed about a perimeter of the filter opening. The knife edge may be configured to extend downwardly relative to the clean room ceiling.

The method may further include engaging a filter with the knife edge of the housing, such that air may be configured to pass between the clean room and the duct via the filter. The filter may comprise a perimetric frame member. The perimetric frame member may define an opening configured to admit air therethrough, and the perimetric frame member may comprise a channel disposed around the perimeter of the opening. The channel may comprise an inner wall; an outer wall; and a bottom wall connecting the inner wall and the outer wall. The filter may further comprise a filter substrate disposed in the opening of the frame, such that the filter substrate may be configured to filter air passing through the opening. The filter may include a gasket disposed about the opening within the channel and an adhesive compound disposed within the channel between the gasket and the bottom wall of the channel. The adhesive compound maybe configured to prevent air from passing between the gasket and the bottom wall. The adhesive compound may be configured to maintain the gasket within the channel.

Embodiments of the filtration system and seal described herein discuss air being inlet to the clean room through the filtration system. One of ordinary skill in the art will appreciate, in light of the present disclosure, that the sealing methods and apparatus discussed herein may be equally applied to an exhaust outlet and/or filter and may be arranged in any area of a clean room (e.g., floor, walls, or ceiling) or in any portion of the connected ventilation system.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. While some drawings and description may omit features described elsewhere for simplicity of explanation, it is understood that these features may nonetheless be present in any of the embodiments in any combination or configuration, as detailed above. Although specific terms are employed herein, they are used in a generic and descriptive sense only and not for purposes of limitation.

The invention claimed is:

1. A filtration system for a clean room, the system comprising:
   a housing configured to engage a clean room ceiling, the housing defining:
      a vent opening and a filter opening, wherein the housing is configured to engage a duct at the vent opening; the housing further comprising:
      a knife edge disposed about a perimeter of the filter opening, wherein the knife edge is configured to extend downwardly relative to the clean room ceiling;
   a filter removably attached to the housing, the filter comprising:
      a frame defining an opening configured to admit air therethrough, and wherein the frame comprises a channel disposed about a perimeter of the opening, the channel defining an inner wall, an outer wall, and a bottom wall therebetween;

a filter substrate disposed in the opening of the frame, such that the filter substrate is configured to filter air passing through the opening;

a gasket disposed about a perimeter of the opening within the channel, wherein the gasket defines a bottom surface, two side surfaces, and two sloped edges extending between respective ones of the two side surfaces and the bottom surface to define a taper between the two side surfaces and the bottom surface, and wherein the bottom surface of the gasket is configured to face the bottom wall of the channel; and an adhesive compound disposed within the channel between the gasket and the channel, wherein the adhesive compound is configured to prevent air from passing between the gasket and the channel, and wherein the adhesive compound is configured to maintain the gasket at least partially within the channel;

wherein the gasket is configured to engage the knife edge of the housing, such that air is configured to pass between the clean room and the duct via the filter.

2. The filtration system of claim 1, wherein the adhesive compound is disposed between the gasket and at least the bottom wall of the channel.

3. The filtration system of claim 1, wherein the frame further comprises a side wall extending about a perimeter of the opening, such that the opening of the frame comprises an upper opening and a lower opening.

4. The filtration system of claim 3, wherein the side wall of the frame is the inner wall of the channel.

5. The filtration system of claim 1, wherein the housing further comprises a flange extending from an inner surface of a side wall of the housing, and wherein the knife edge is attached to the flange.

6. The filtration system of claim 5, wherein the knife edge is attached at a distal end of the flange opposite a connection between the flange and the inner surface of the side wall of the housing.

7. The filtration system of claim 1, wherein the gasket comprises a fully-cured, cross-linked silicone.

8. The filtration system of claim 1, wherein the housing further comprises at least one attachment tab configured to engage the filter in a working position.

9. The filtration system of claim 8, wherein the housing further comprises a tab support configured to slidably receive the attachment tab and a retaining member configured to retain the attachment tab on the tab support.

10. The filtration system of claim 9, wherein the attachment tab comprises a protrusion configured to engage the filter, and wherein the attachment tab comprises a collar defining a cylindrical bore for receiving at least a portion of the tab support therein.

11. The filtration system of claim 10, wherein the tab support further comprises a support collar, and wherein the support collar is configured to engage the collar in a working position of the filter.

12. The filtration system of claim 6, wherein the flange defines a first portion extending perpendicular to the inner surface of the side wall, wherein the knife edge extends from a distal end of the first portion perpendicular to the first portion and parallel to the inner surface of the side wall, wherein the housing further comprises:

a tab support extending perpendicular to the first portion of the flange between the knife edge and the inner surface of the side wall, the tab support defining a threaded portion;

an attachment tab comprising a collar defining a cylindrical bore;

wherein the threaded portion extends through the cylindrical bore of the attachment tab, wherein the attachment tab is configured to engage the filter in a working position and apply a force to compress the gasket against the knife edge in the working position, and wherein a nut is threaded onto the threaded portion to cause the attachment tab to engage the filter in the working position.

13. The filtration system of claim 12, wherein the tab support further comprises a support collar disposed between the first portion of the flange and the threaded portion of the tab support, wherein the collar of the attachment tab is configured to engage the support collar in the working position to define a predetermined compression of the gasket.

14. The filtration system of claim 12, wherein the attachment tab defines a protrusion extending perpendicular to an axis of the cylindrical bore of the collar, wherein the attachment tab is rotatable about the axis of the cylindrical bore and about an axis of the threaded portion of the tab support between the working position and a released position, wherein the protrusion is configured to engage the filter in the working position, and wherein in the released position the filter is configured to be removed from the housing without removing the nut from the threaded portion.

15. The filtration system of claim 1, further comprising a duct attached to the vent opening of the housing and configured to permit air to be delivered to an interior of the housing, wherein the filter is disposed entirely within the housing, and wherein the filter is configured to filter air passing from the duct to an exterior of the housing.

16. The filtration system of claim 1, wherein the gasket comprises a void extending along a center axis of the gasket, such that the void extends about the perimeter of the opening.

17. The filtration system of claim 1, wherein the two sloped edges define flat, planar surfaces in an undeformed state.

18. The filtration system of claim 1, wherein the gasket further comprises a top surface, the top surface defining a recess configured to engage the knife edge, the recess defining raised edges extending parallel to the center axis of the gasket, such that the raised edges extend about the perimeter of the opening.

19. The filtration system of claim 1, wherein the gasket comprises a fully-cured, cross-linked silicone.

20. A filter for a clean room comprising:

a frame defining an opening configured to admit air therethrough, and wherein the frame comprises a channel disposed about a perimeter of the opening, the channel defining an inner wall, an outer wall, and a bottom wall therebetween;

a filter substrate disposed in the opening of the frame, such that the filter substrate is configured to filter air passing through the opening;

a gasket disposed about a perimeter of the opening within the channel, wherein the gasket defines a bottom surface, two side surfaces, and two sloped edge extending between respective ones of the two side surfaces and the bottom surface to define a taper between the two side surfaces and the bottom surface, and wherein the bottom surface of the gasket is configured to face the bottom wall of the channel; and an adhesive compound disposed within the channel between the gasket and the channel, wherein the adhesive compound is configured to prevent air from passing between the gasket and the channel, and wherein the adhesive compound is configured to maintain the gasket at least partially within the channel.

21. The filter of claim 20, wherein the adhesive compound is disposed between the gasket and at least the bottom wall of the channel.

22. The filter of claim 20, wherein the frame further comprises a side wall extending about a perimeter of the opening, such that the opening of the frame comprises an upper opening and a lower opening.

23. The filter of claim 22, wherein the side wall of the frame is the inner wall of the channel.

24. The filter of claim 20, wherein the gasket comprises a fully-cured, cross-linked silicone.

25. The filter of claim 20, wherein the gasket comprises a void extending along a center axis of the gasket, such that the void extends about the perimeter of the opening.

26. The filter of claim 20, wherein the at least one sloped edge is disposed at an intermediate angle between an angle of the at least one of the two side surfaces and an angle of the bottom surface, and wherein a width of the bottom surface is less than a distance between the two side surfaces.

27. The filter of claim 20, wherein the gasket comprises a void extending along a center axis of the gasket, such that the void extends about the perimeter of the opening, wherein each sloped edge is disposed at a respective intermediate angle between an angle of the respective ones of the two side surfaces and an angle of the bottom surface, and wherein a width of the bottom surface is less than a distance between the two side surfaces.

28. The filter of claim 20, wherein the two sloped edges define flat, planar surfaces in an undeformed state.

29. The filter of claim 20, wherein the gasket further comprises a top surface, the top surface defining a recess configured to engage the knife edge, the recess defining raised edges extending parallel to the center axis of the gasket, such that the raised edges extend about the perimeter of the opening.

* * * * *